US010436302B2

(12) United States Patent
Isono et al.

(10) Patent No.: US 10,436,302 B2
(45) Date of Patent: Oct. 8, 2019

(54) TORQUE VECTORING DEVICE

(71) Applicants: TOYOTA JIDOSHA KABUSHIKI KAISHA, Toyota-shi, Aichi-ken (JP); ALCHEMICA CORPORATION, Susono-shi, Shizuoka-ken (JP)

(72) Inventors: Hiroshi Isono, Susono (JP); Nobuyoshi Sugitani, Susono (JP); Aizoh Kubo, Kyoto (JP)

(73) Assignees: TOYOTA JIDOSHA KABUSHIKI KAISHA, Toyota (JP); ALCHEMICA CORPORATION, Susono-shi (JP)

( * ) Notice: Subject to any disclaimer, the term of this patent is extended or adjusted under 35 U.S.C. 154(b) by 169 days.

(21) Appl. No.: 15/427,357

(22) Filed: Feb. 8, 2017

(65) Prior Publication Data
US 2017/0241532 A1    Aug. 24, 2017

(30) Foreign Application Priority Data

Feb. 24, 2016   (JP) ................. 2016-032822

(51) Int. Cl.
*F16H 48/36*  (2012.01)
*F16H 48/10*  (2012.01)

(52) U.S. Cl.
CPC ............ *F16H 48/36* (2013.01); *F16H 48/10* (2013.01); *F16H 2048/104* (2013.01); *F16H 2048/106* (2013.01); *F16H 2048/364* (2013.01); *F16H 2048/368* (2013.01)

(58) Field of Classification Search
CPC ..... F16H 48/36; F16H 48/10; F16H 2048/364
See application file for complete search history.

(56) References Cited

U.S. PATENT DOCUMENTS

| 8,672,790 | B2 | 3/2014 | Severinsson et al. |
| 8,899,122 | B2 * | 12/2014 | Van Druten ........... B60K 6/365 74/331 |
| 2002/0162409 | A1 | 11/2002 | Ito et al. |
| 2002/0166676 | A1 | 11/2002 | Andriani |
| 2015/0232070 | A1 | 8/2015 | Sten |

(Continued)

FOREIGN PATENT DOCUMENTS

| EP | 1 238 890 A1 | 9/2002 |
| JP | 2002-310265 A | 10/2002 |

(Continued)

OTHER PUBLICATIONS

Oct. 4, 2017 Office Action issued in U.S. Appl. No. 15/428,468.
May 3, 2018 Office Action issued in U.S. Appl. No. 15/428,468.

*Primary Examiner* — Erin D Bishop
(74) *Attorney, Agent, or Firm* — Oliff PLC

(57) ABSTRACT

A torque vectoring device has a downsized brake device for stopping drive wheels. The torque vectoring device comprises: a drive motor; a differential unit including a first planetary gear unit connected to a right drive wheel, and a second planetary gear unit connected to a left drive wheel; a differential motor that applies torque to any one of reaction elements; a torque reversing mechanism that transmits torque between the reaction elements while reversing; a rotary shaft connecting input elements; a rotary member that transmits torque of an output shaft of the drive motor; and a brake device that is contacted frictionally to the rotary member to establish a braking force.

4 Claims, 6 Drawing Sheets

(56) References Cited

U.S. PATENT DOCUMENTS

2016/0153537 A1 6/2016 Kubo et al.
2017/0227104 A1 8/2017 Isono et al.
2017/0241533 A1 8/2017 Isono et al.

FOREIGN PATENT DOCUMENTS

| JP | 2012-519812 A | 8/2012 |
| WO | 2010/101506 A1 | 9/2010 |
| WO | 2015/008661 A1 | 1/2015 |

* cited by examiner

TORQUE VECTORING DEVICE

CROSS REFERENCE TO RELATED APPLICATION

The present invention claims the benefit of Japanese Patent Application No. 2016-032822 filed on Feb. 24, 2016 with the Japanese Patent Office, the disclosures of which are incorporated herein by reference in its entirety.

BACKGROUND

Field of the Invention

Embodiments of the present application relate to the art of a torque vectoring device for controlling a split ratio of a torque generated by a drive motor to right and left drive wheels.

Discussion of the Related Art

PCT international publication WO 2015/008661 describes one example of a torque vectoring device of this kind. The drive gear unit taught by WO 2015/008661 as a torque vectoring device comprises a differential unit for distributing torque delivered from a drive motor to right and left drive wheels, and a differential motor for controlling a torque split ratio to the drive wheels. The differential unit is comprised of a pair of single-pinion planetary gear units. In the differential unit, sun gears are rotated by a torque of the drive motor, ring gears of are connected to each other in such a manner as to rotate in opposite directions, and the carriers are connected to drive wheels through driveshafts.

In a vehicle provided with the torque vectoring device taught by WO 2015/008661, torque split ratio to the right and left drive wheels may be altered by the torque vectoring device. In the vehicle of this kind, braking force applied to each of the drive wheels has to be controlled by conventional brake devices individually arranged to control each of the drive wheels. In order to ensure sufficient braking force, the brake device of this kind is provided with a rotary member such as a disc and a drum, a friction member contacted to the rotary member, and an actuator such as a hydraulic cylinder. However, a weight of the brake device of this kind is rather heavy and hence an unsprung load of the vehicle may be increased. In the vehicle thus using the conventional torque vectoring device, therefore, vibrations may be increased.

SUMMARY

Aspects of embodiments of the present application have been conceived noting the foregoing technical problems, and it is therefore an object of embodiments of the present application is to provide a torque vectoring device having a downsized brake device for applying a braking force to a drive wheel.

The present application relates to a torque vectoring device, comprising: a drive motor; a differential unit including: a first planetary gear unit having a first input element to which torque of the drive motor is applied, a first output element connected to one of drive wheels, and a first reaction element which establishes reaction torque to output the torque of first input element from the first output element; and a second planetary gear unit having a second input element to which torque of the drive motor is applied, a second output element connected to the other drive wheel, and a second reaction element which establishes reaction torque to output the torque of second input element from the second output element; a differential motor that applies torque to any one of the first reaction element and the second reaction element; a torque reversing mechanism that transmits the torque of the first reaction element to the second reaction element while reversing a direction; a rotary shaft connecting the first input element and the second input element; and a rotary member that transmits torque of an output shaft of the drive motor. In order to achieve the above-explained objective, according to the embodiment of the present application, the torque vectoring device is provided with a brake device that is contacted frictionally to the rotary member to establish a braking force.

In a non-limiting embodiment, the first planetary gear unit may serve as a speed reducer when the first reaction element is rotated slower than the first input element. Likewise, the second planetary gear unit may serve as a speed reducer when the second reaction element is rotated slower than the second input element.

In a non-limiting embodiment, the brake device is adapted to apply the braking force to the rotary member by frictionally contacting any one of the first reaction element and the first output element to one face of the rotary member, while frictionally contacting any one of the second reaction element and the second output element to the other face of the rotary member.

In a non-limiting embodiment, the drive motor may be adapted to generate a brake torque to reduce a rotational speed of the output shaft, and the rotary member may be rotated integrally with the output shaft of the drive motor.

In a non-limiting embodiment, the rotary member may be fitted onto another rotary shaft other than the rotary shaft.

In a non-limiting embodiment, the rotary member includes an output gear of the drive motor.

In a non-limiting embodiment, the torque vectoring device may further comprises: a first brake gear meshed with any one of the first reaction element and the first output element; and a second brake gear meshed with any one of the second reaction element and the second output element. In addition, the brake device may be adapted to apply the braking force to the rotary member by frictionally contacting first brake gear to one face of the rotary member, while frictionally contacting second brake gear to the other face of the rotary member.

In a non-limiting embodiment, the brake device may be adapted to electromagnetically control a friction force to be contacted to the rotary member.

In a non-limiting embodiment, the brake device may include a wet-type brake device in which oil is interposed between faces frictionally contacted to each other.

In the torque vectoring device according to the embodiment of the present application, torque of the output shaft of the drive motor is delivered through the rotary member to the rotary shaft connected to the input elements of the planetary gear units, and rotation of the rotary member is frictionally stopped by the brake device. According to the embodiment of the present application, therefore, a braking force may be applied to drive wheels by applying a braking force to the rotary member by the brake device. For this reason, it is not necessary to arrange separated brake devices to halt the drive wheels, or the brake devices of the drive wheels may be downsized. Consequently, an unsprung load of the vehicle may be reduced to stabilize vehicle behavior and to improve comfort. Further, since the rotary member serves as a brake rotor, brake device arranged in the torque vectoring device may be downsized.

When the reaction element to which torque of the differential motor is applied is rotated slower than the input element, the planetary gear unit serves as a speed reducer. Specifically, given that the output elements of the planetary gear units are rotated at the same speed, the reaction elements are stopped. By contrast, given that the output elements of the planetary gear units are rotated at different speeds, the reaction elements are rotated relatively to each other and consequently the differential motor is rotated. In this situation, the reaction elements are rotated at extremely low speeds. Consequently, each of the planetary gear units individually serves as a speed reducer to multiply the torque of the rotary member to be applied to the output element. According to the embodiment of the present application, therefore, the torque vectoring device may be downsized.

As described, the braking force is applied to the rotary member by frictionally contacting any one of the reaction element and the output element to the rotary member. According to the embodiment of the present application, therefore, the reaction element or the output element may serve as a brake disc. For this reason, the brake device may be downsized.

As also described, the rotary member is rotated integrally with the output shaft of the drive motor. According to the embodiment of the present application, therefore, shares of brake torques of the drive motor and the brake device may be adjusted easily.

As also described, the rotary member may also be fitted onto the output shaft of the drive motor instead of the rotary shaft. According to the embodiment of the present application, therefore, transfer of the heat of the brake device resulting from frictional engagement to the rotary elements of the differential unit may be reduced. For this reason, power loss of the differential unit resulting from thermal expansion of the rotary element may be prevented.

As also described, the friction contact force of the brake device may be controlled electromagnetically. According to the embodiment of the present application, therefore, the brake device, the drive motor and the differential motor may be controlled cooperatively.

As also described, in the brake device oil is interposed between contact faces. According to the embodiment of the present application, therefore, friction heat of the brake device heated frictionally may be cooled by the oil. For this reason, power loss resulting from thermal expansion of the rotary elements may be prevented.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 6:
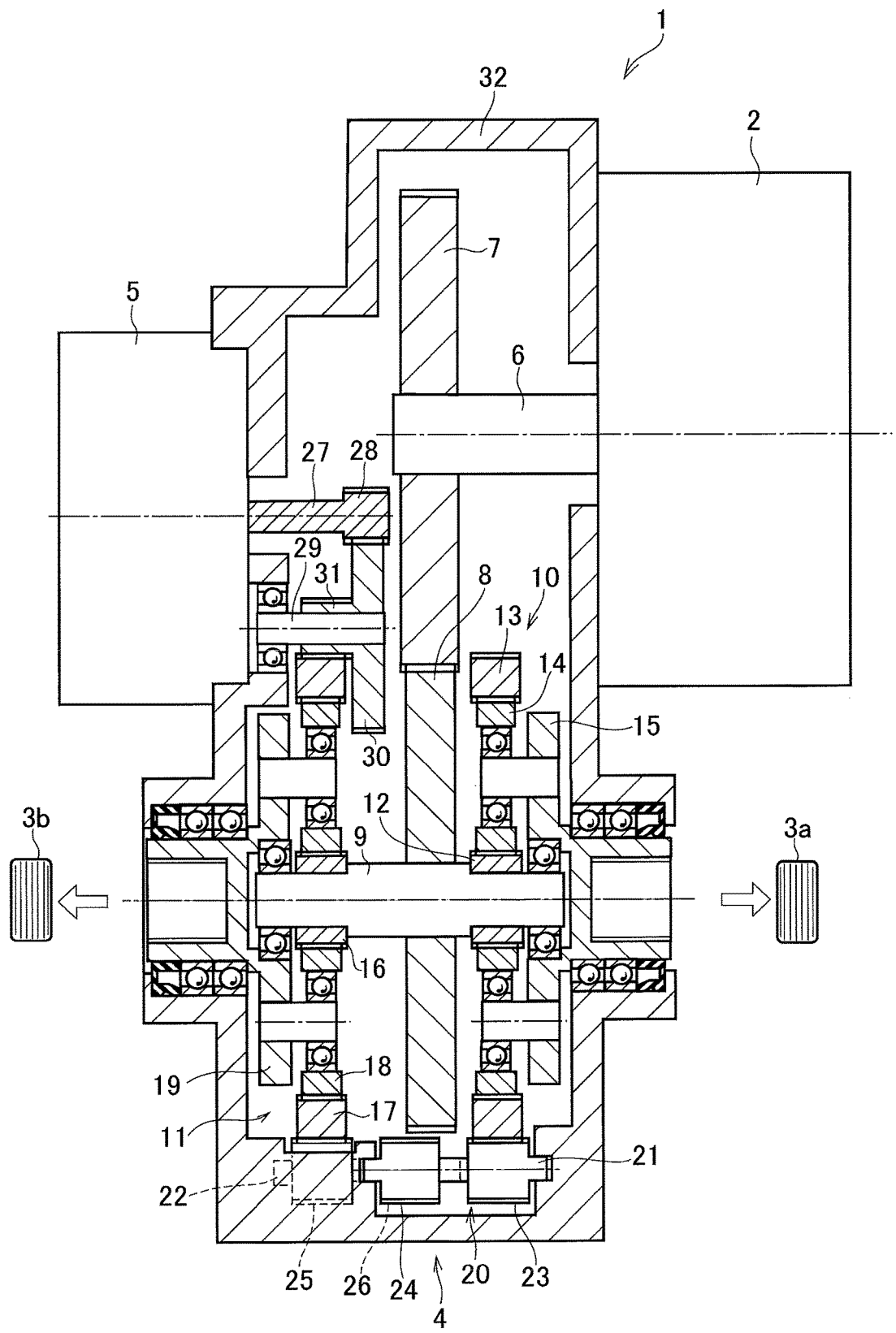
FIG. 6 is a schematic illustration showing one example of a basic structure of the torque vectoring device to which the present application is applied.

The preferred embodiments of the present application will now be explained with reference to the accompanying drawings. Referring now to FIG. 6, there is shown one example of a basic structure of the torque vectoring device to which the present application is applied. The torque vectoring device 1 shown in FIG. 1 comprises a drive motor 2 serving as a prime mover of a vehicle, a differential unit 4 that distributes an output torque of the drive motor 2 to a right drive wheel 3b and a left drive wheel 3a, and a differential motor 5 that controls a split ratio of a torque distributed to the right drive wheel 3b and the left drive wheel 3a. For example, a permanent magnet synchronous motor may be used as the drive motor 2.

An output gear 7 is fitted onto an output shaft 6 of the drive motor 2 while being meshed with a driven gear 8 fitted onto a rotary shaft 9 of the differential unit 4.

The rotary shaft 9 extends parallel to the output shaft 6 of the drive motor 2 to connect a first planetary gear unit 10 to a second planetary gear unit 11. In the example shown in FIG. 6, a single-pinion planetary gear unit is individually used as the first planetary gear unit 10 and the second planetary gear unit 11.

The first planetary gear unit 10 comprises: a first sun gear 12 fitted onto one end of the rotary shaft 9; a first ring gear 13 that is diametrically larger than the driven gear 8 and arranged concentrically with the first sun gear 12; a plurality of first planetary gears 14 interposed between the first sun gear 12 and the first ring gear 13 while meshing with those gears; and a first carrier 15 supporting the first planetary gears 14 in such a manner as to allow the first planetary gears 14 to rotate around the first sun gear 12. The first carrier 15 is connected to the right drive wheel 3a through one of driveshafts (not shown). Accordingly, the first sun gear 12 serves as the "first input element", the first ring gear 13 serves as the "first reaction element", and the first carrier 15 serves as the "first output element". In addition, an outer tooth is formed on an outer circumference of the first ring gear 13. Here, a double-pinion planetary gear unit may also be used as the first planetary gear unit 10.

The second planetary gear unit 11 comprises: a second sun gear 16 fitted onto the other end of the rotary shaft 9; a second ring gear 17 that is diametrically larger than the driven gear 8 and arranged concentrically with the second sun gear 16; a plurality of second planetary gears 18 interposed between the second sun gear 16 and the second ring gear 17 while meshing with those gears; and a second carrier 19 supporting the second planetary gears 18 in such a manner as to allow the second planetary gears 18 to rotate around the second sun gear 16. The second carrier 19 is connected to the left drive wheel 3b through the other driveshaft (not shown). Accordingly, the second sun gear 16 serves as the "second input element", the second ring gear 17 serves as the "second reaction element", and the second carrier 19 serves as the "second output element." In addition, an outer tooth is formed on an outer circumference of the second ring gear 17. Here, a double-pinion planetary gear unit may also be used as the second planetary gear unit 11.

The first ring gear 13 and the second ring gear 17 are connected to each other through a torque reversing mechanism 20 arranged parallel to the rotary shaft 9. The torque reversing mechanism 20 comprises a first connection shaft 21 supported by a casing 32 in a rotatable manner, and a second connection shaft 22. A first pinion gear 23 is formed on one end of the first connection shaft 21 to be meshed with the outer tooth of the first ring gear 13, and a second pinion gear 24 is formed on the other end of the first connection shaft 21. Likewise, a third pinion gear 25 is formed on one end of the second connection shaft 22 to be meshed with the outer tooth of the second ring gear 17, and a fourth pinion gear 26 is formed on the other end of the second connection shaft 22 to be meshed with the second pinion gear 24. Here, teeth number of the second pinion gear 24 and teeth number of the fourth pinion gear 26 are identical to each other so that the first connection shaft 21 and the second connection shaft 22 are rotated at same speeds in opposite directions. In the differential unit 4, a plurality of the torque reversing mechanism 20 are arranged around the first planetary gear unit 10 and the second planetary gear unit 11 at regular intervals.

In order to apply torque to the first ring gear 13 and the second ring gear 17, the torque vectoring device 1 is provided with a differential motor 5. For example, a permanent magnet synchronous motor and an induction motor may be used as the differential motor 5. In the example shown in FIG. 6, an output shaft 27 of the differential motor 5 is arranged parallel to the output shaft 6 of the drive motor 5 and the rotary shaft 9, and an output gear 28 is fitted onto a leading end of the output shaft 27. A countershaft 29 extends parallel to the output shaft 27 of the differential motor 5, and a counter driven gear 30 that is diametrically larger than the output gear 28 is fitted onto one end of the countershaft 29 while being meshed with the output gear 28. A counter drive gear 31 that is diametrically smaller than the counter driven gear 30 is also fitted onto the countershaft 29 to be connected to the counter driven gear 30 while being meshed with the outer tooth of the second ring gear 17. Thus, an output torque of the differential motor 5 is applied to the second ring gear 17 while being multiplied. Alternatively, the output torque of the differential motor 5 may also be applied to the first ring gear 13.

The first planetary gear unit 10, the second planetary gear unit 11, the output gear 7 and the output gear 28 are held in the casing 32, and in the casing 32, oil is applied to those elements for the purpose of lubrication and cooling.

In the torque vectoring device shown in FIG. 6, the output torque of the drive motor 2 is applied to the first sun gear 12 and the second sun gear 16. Consequently, the torque is applied to the first ring gear 13 in the opposite direction to that applied to the first sun gear 12, and the torque is applied to the second ring gear 17 in the opposite direction to that applied to the second sun gear 16. That is, torques are applied to the first ring gear 13 of the first planetary gear unit 10 and the second ring gear 17 of the second planetary gear unit 11 in the same direction. However, since the first ring gear 13 and the second ring gear 17 are connected through the torque reversing mechanism 20, the torques of the first ring gear 13 and the second ring gear 17 counteract to each other. That is, the first ring gear 13 and the second ring gear 17 individually serves as a reaction element when e.g., stopping during travelling in a straight line.

Consequently, the torque applied to the first sun gear 12 is delivered to the first carrier 15 while being amplified in accordance with a gear ratio of the first planetary gear unit 10, and further delivered to the right drive wheel 3a through the driveshaft. Likewise, the torque applied to the second sun gear 16 is delivered to the second carrier 19 while being amplified in accordance with a gear ratio of the second planetary gear unit 11, and further delivered to the left drive wheel 3b through the driveshaft. As described, since structures of the first planetary gear unit 10 and the second planetary gear unit 11 are identical to each other, same torques are delivered from the first carrier 15 and the second carrier 19 to the right drive wheel 3a and the left drive wheel 3b to rotate the right drive wheel 3a and the left drive wheel 3b at the same speed.

When the differential motor 5 generates torque, a reaction torque established by the second ring gear 17 of the second planetary gear unit 11 is changed and consequently the torque of the second carrier 19 is changed. For example, an output torque of the second carrier 19 is increased by generating torque by the differential motor 5 in such a manner as to increase the reaction torque of the second ring gear 17. In this case, the first ring gear 13 is subjected to the torque in a direction to weaken the reaction torque thereof, and consequently the output torque of the first carrier 15 is reduced. That is, a torque distribution ratio to the right drive wheel 3a and to the left drive wheel 3b can be altered by thus generating torque by the differential motor 5.

By contrast, during turning of the vehicle, the right drive wheel 3a and the left drive wheel 3b are rotated at different speeds. In this case, a relative rotation is caused between the first ring gear 13 and the second ring gear 17 and consequently the differential motor 5 is rotated. For example, when the left drive wheel 3b connected to the second carrier 19 is rotated faster than the right drive wheel 3a connected to the first carrier 15, the first sun gear 12 and the second sun gear 16 are still rotated at the same speed and hence it is necessary to absorb a speed difference between the first carrier 15 and the second carrier 19 by absorbing a speed difference between the first ring gear 13 and the second ring gear 17.

As a result of rotating the first ring gear 13 and the second ring gear 17 at different speeds, the differential motor 5 is rotated by such speed difference through the second ring gear 17, the counter drive gear 31, the output gear 28, and the output shaft 27. In this situation, the torque distribution ratio to the right drive wheel 3a and to the left drive wheel 3b can be altered arbitrarily by generating torque by the differential motor 5 without changing speeds of the rotary elements.

Here, during turning of the vehicle, the first ring gear 13 and the second ring gear 17 are rotated at extremely low speeds to adjust differential rotation between the right drive wheel 3a and the left drive wheel 3b. That is, the first planetary gear unit 10 and the second planetary gear unit 11 individually serves as a speed reducing unit even if the first ring gear 13 and the second ring gear 17 are rotated. Specifically, during turning of the vehicle, the torque applied to the first sun gear 12 is delivered to the right drive wheel 3a from the first carrier 15 while being multiplied, and the torque applied to the second sun gear 16 is delivered to the left drive wheel 3b from the second carrier 19 while being multiplied.

According to the present application, the torque vectoring device shown in FIG. 6 is provided with a brake device B to be explained hereinafter. In the following explanation, detailed explanations for the common elements will be omitted by allotting common reference numerals thereto, and the casing 32 and the differential motor 5 are omitted in FIGS. 1 and 2 for the sake of illustration.

Figure 1:
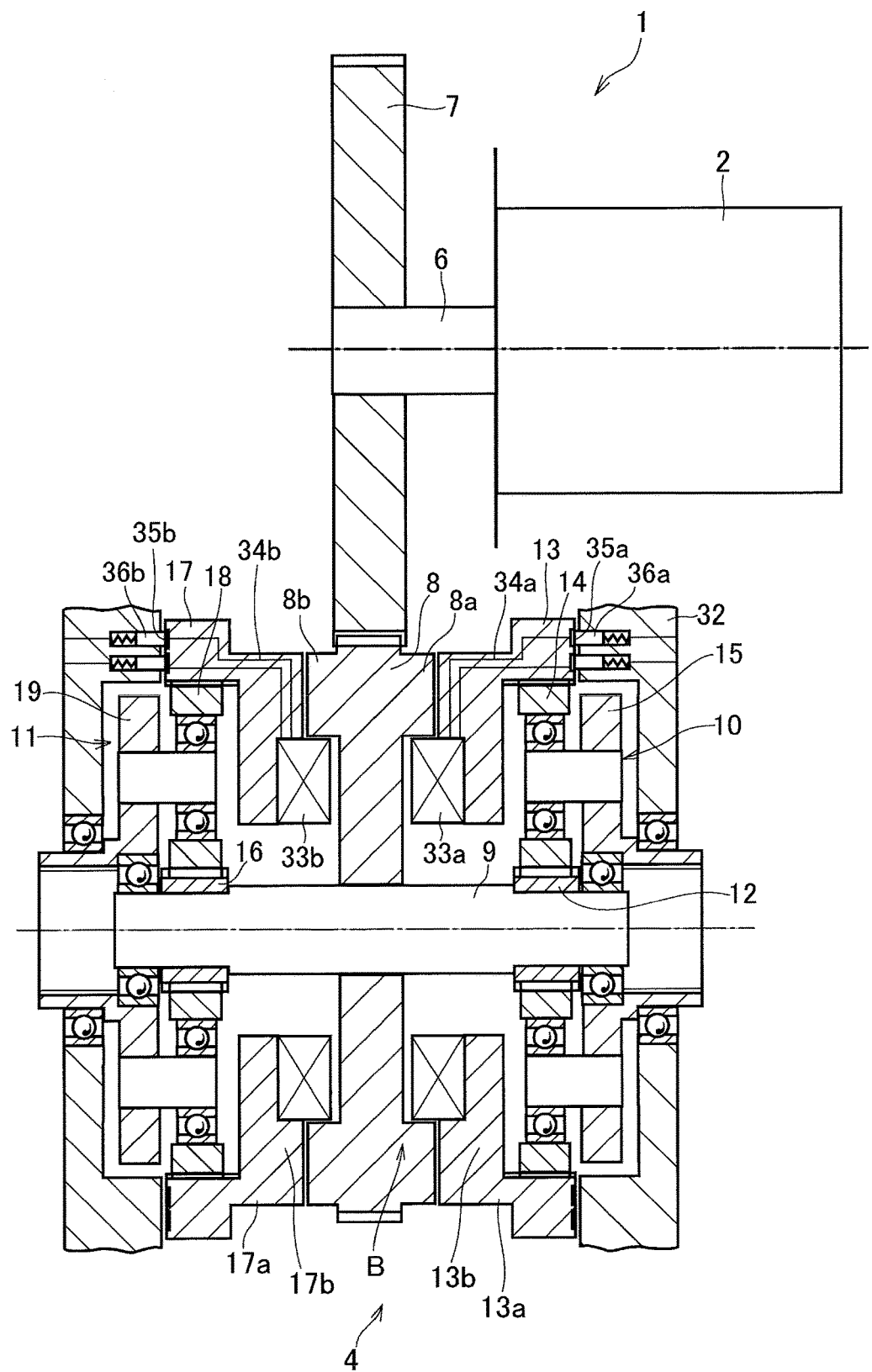
FIG. 1 is a schematic illustration showing a structure of the torque vectoring device according to a first example of the present application.

Turning to FIG. 1, there is shown a first example of a drive force controlling device 1 having the brake device B in which the driven gear 8 as a rotary member is used as a brake rotor, and the first ring gear 13 and the second ring gear 17 are used as a brake disc. According to the first example, specifically, a pair of first rim 8*a* and second rim 8*b* is formed on each face of the driven gear 8.

The first ring gear 13 includes a first cylindrical portion 13*a* protruding toward the driven gear 8, and an annular first contact portion 13*b* formed on a leading end of the first cylindrical portion 13*a*. A friction member is attached to a contact face of the first contact portion 13*b* to be contacted to the first rim 8*a* of the driven gear 8. A first coil 33*a* is fitted into a depression formed on an inner circumference of the first contact portion 13*b* of the first ring gear 13. Here, a clearance between the first contact portion 13*b* and the first rim 8*a* is narrower than a clearance between the first coil 33*a* and the driven gear 8.

In order to supply current to the first coil 33*a*, a first lead wire 34*a* is arranged in the first ring gear 13 to connect the first coil 33*a* to an annular first terminal 35*a* attached to a face of the first ring gear 13 opposed to the casing 32. The first terminal 35*a* is contacted to a first brush 36*a* arranged in the casing 32, and an electric power is supplied to the first terminal 35*a* from a not shown battery. For example, a spur gear and a helical gear may be used as the first ring gear 13, and the first ring gear 13 is allowed to reciprocate in the axial direction of the rotary shaft 9.

The second ring gear 17 includes a second cylindrical portion 17*a* protruding toward the driven gear 8, and an annular second contact portion 17*b* formed on a leading end of the second cylindrical portion 17*a*. A friction member is attached to a contact face of the second contact portion 17*b* to be contacted to the second rim 8*b* of the driven gear 8. A second coil 33*b* is fitted into a depression formed on an inner circumference of the second contact portion 17*b* of the second ring gear 17. Here, a clearance between the second contact portion 17*b* and the second rim 8*b* is narrower than a clearance between the second coil 33*b* and the driven gear 8.

In order to supply current to the second coil 33*b*, a second lead wire 34*b* is arranged in the second ring gear 17 to connect the second coil 33*b* to an annular second terminal 35*b* attached to a face of the second ring gear 17 opposed to the casing 32. The second terminal 35*b* is contacted to a second brush 36*b* arranged in the casing 32, and an electric power is supplied to the second terminal 35*b* from a not shown battery. For example, a spur gear and a helical gear may also be used as the second ring gear 17, and the second ring gear 17 is also allowed to reciprocate in the axial direction of the rotary shaft 9.

In the torque vectoring device 1, in order to stop the rotation of the rotary shaft 9, the first contact portion 13*b* is brought into frictional contact to the first rim 8*a* by energizing the first coil 33*a*, and the second contact portion 17*b* is brought into frictional contact to the second rim 8*b* by energizing the second coil 33*b*. A frictional force between the first contact portion 13*b* and the first rim 8*a*, and a frictional force between the second contact portion 17*b* and the second rim 8*b* may be controlled individually by controlling supply currents to the first coil 33*a* and the second coil 33*b*. In addition, oil is interposed between the first contact portion 13*b* and the first rim 8*a*, and between the second contact portion 17*b* and the second rim 8*b*. That is, a wet-type electromagnetic brake device B is formed by the first ring gear 13, the second ring gear 17 and the driven gear 8.

As described, since the first planetary gear unit 10 and the second planetary gear unit 11 individually serves as a speed reducing unit, the first sun gear 12 is rotated at a speed higher than that of the first carrier 15, and the second sun gear 16 is rotated at a speed higher than that of the second carrier 19. Accordingly, when the first contact portion 13*b* and the second contact portion 17*b* are individually contacted frictionally to the first rim 8*a* and the second rim 8*b*, torques are applied to the first sun gear 12 and the second sun gear 16 in a direction to reduce rotational speeds. In this situation, although torques are applied to the first ring gear 13 and the second ring gear 17 in a direction to increase a rotational speeds, torques applied to the first ring gear 13 and the second ring gear 17 are cancelled to each other by the torque reversing mechanism 20. That is, the first ring gear 13 and the second ring gear 17 also serve as reaction elements even when stopping the rotation of the rotary shaft 9.

In other words, as a result of contacting the first contact portion 13*b* and the second contact portion 17*b* to the first rim 8*a* and the second rim 8*b*, a differential action between the first planetary gear unit 10 and the second planetary gear unit 11 is restricted. Consequently, rotational speeds of the first sun gear 12 and the first carrier 15 are synchronized to a rotational speed of the first ring gear 13 by the torques applied to the first sun gear 12 and the first carrier 15. Also, rotational speeds of the second sun gear 16 and the second carrier 19 are synchronized to a rotational speed of the second ring gear 17 by the torques applied to the second sun gear 16 and the second carrier 19. In this situation, since the first planetary gear unit 10 and the second planetary gear unit 11 individually serves as a speed reducing unit, torques of the first sun gear 12 and the second sun gear 16 are applied to the first carrier 15 and the second carrier 19 while being amplified, and consequently the rotational speeds of the first carrier 15 and the second carrier 19 are reduced. That is, a brake torque applied to the driven gear 8 is further applied to the first carrier 15 and the second carrier 19 while being multiplied. In addition, although not illustrated in FIG. 1, the brake torque established by the brake device B is applied to the first carrier 15 and the second carrier 19 while being multiplied also in a case of changing the torque distribution ratio to the first carrier 15 and to the second carrier 19 by generating torque by the differential motor 5.

Thus, in the torque vectoring device 1, the brake device B is configured to apply braking force to the driven gear 8 connected to the first sun gear 12 and the second sun gear 16 as the input elements of the planetary gear units 10 and 11. For this reason, the brake device B may be downsized. In addition, it is not necessary to arrange separated brake devices to halt the drive wheels 3*a* and 3*b*, or the brake devices of the drive wheels 3*a* and 3*b* may be downsized. For this reason, an unsprung load of the vehicle may be reduced to stabilize vehicle behavior and to improve comfort. Further, since the driven gear 8 serves as a brake rotor, and the first ring gear 13 and the second ring gear 17 serve as a brake disc, it is unnecessary to arrange optional members to stop the rotation of the rotary shaft 9. For this reason, torque vectoring device 1 may be downsized.

As described, although the driven gear 8, the first ring gear 13 and the second ring gear 17 are frictionally heated, those gears may be cooled by the oil interposed therebetween. For this reason, damages on the driven gear 8, the first ring gear 13 and the second ring gear 17 may be limited even if those gears are used as the brake device B. Moreover, power loss resulting from thermal expansion of the first ring gear 13 and the second ring gear 17 may be prevented. As also described, since the brake device B, the drive motor 2 and the differential motor 5 are controlled electrically, those members may be controlled cooperatively. In addition, since the first rim 8*a* and the second rim 8*b* are formed on outer circumference of the driven gear 8, the brake torque is applied to the driven gear 8 while being amplified in accordance with a distance between the rotational center and the rim. For this reason, a contact pressure between the first contact portion 13b and the first rim 8a, and a contact pressure between the second contact portion 17b and the second rim 8b may be reduced. In other words, currents applied to the first coil 33a and the second coil 33b may be reduced.

Figure 2:
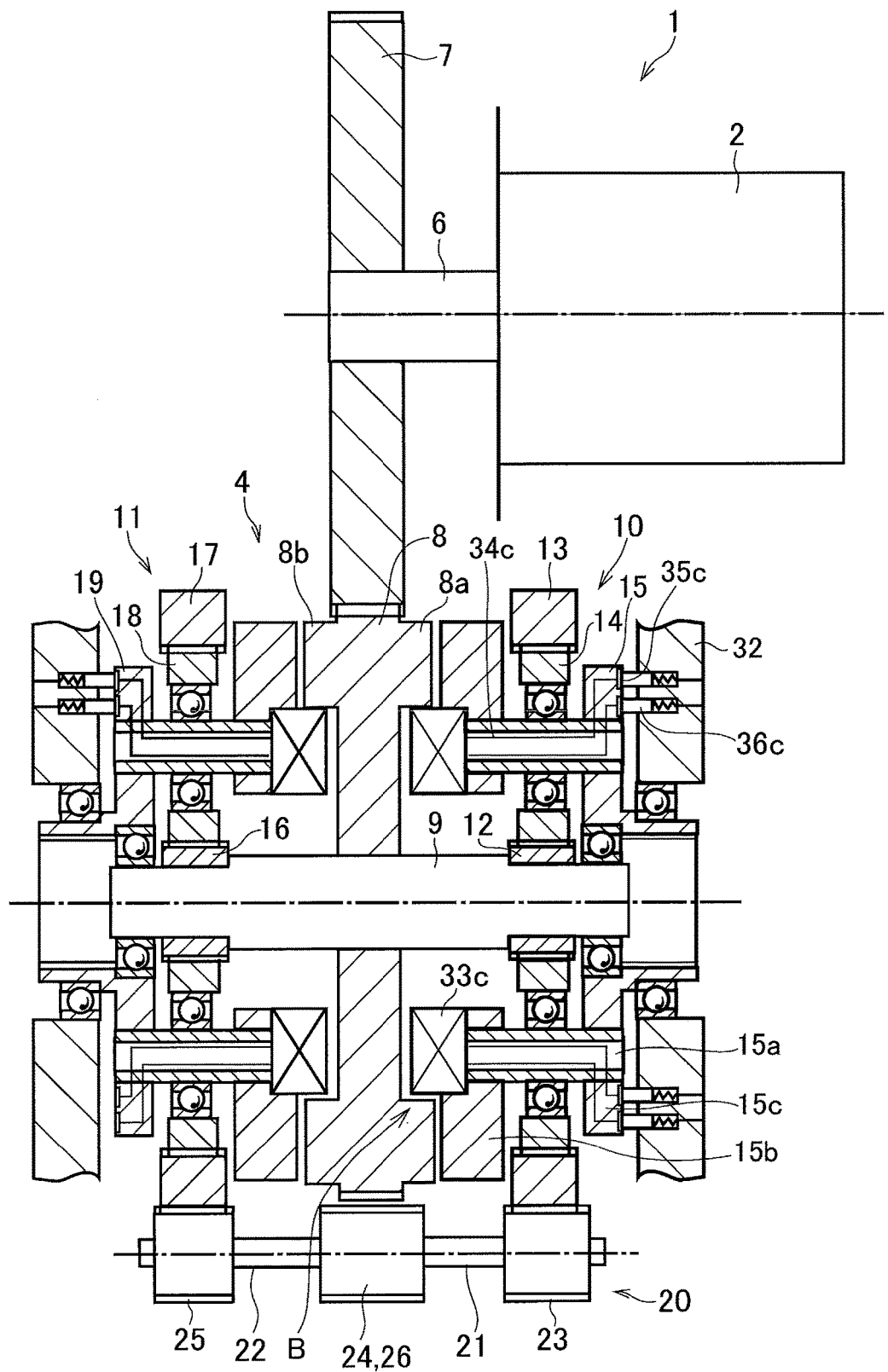
FIG. 2 is a schematic illustration showing a structure of the torque vectoring device according to a second example in which the carrier is used as a brake disc.

Turning to FIG. 2, there is shown a second example of the torque vectoring device 1 in which the first carrier 15 and the second carrier 19 are frictionally contacted to the driven gear 8. Since the structure of the differential unit 4 is symmetrically across the driven gear 8, only the structure in the right half of the differential unit 4 will be explained, and detailed explanations for the common elements will be omitted by allotting common reference numerals thereto.

According to the second example, the first cylindrical portion 13a and the first contact portion 13b are not formed in the first ring gear 13, and the second cylindrical portion 17a and the second contact portion 17b are not formed in the second ring gear 17. That is, the first ring gear 13 and the second ring gear 17 are individually formed into annular shape. A first annular plate 15b is splined to leading ends of first pinion shafts 15a in such a manner as to reciprocate on the first pinion shafts 15a and to rotate integrally with the first pinion shafts 15a. An outer diameter of the first annular plate 15b is substantially identical to that of the driven gear 8, and a friction member is attached to a contact face of the first annular plate 15b to be contacted to the first rim 8a of the driven gear 8.

A third coil 33c is fitted into a depression formed on an inner circumference of the contact face of the first annular plate 15b. As the first coil 33a, the third coil 33c is energized by the not shown battery. In order to supply current to the third coil 33c, a third lead wire 34c is arranged in the first pinion shaft 15a to connect the third coil 33c to an annular third terminal 35c attached to an annular plate 15c formed around the first pinion shafts 15a. The third terminal 35c is contacted to a third brush 36c arranged in the casing 32, and an electric power is supplied to the third terminal 35c from the battery.

According to the second example, brake torque can be applied to the drive wheels 3a and 3b by energizing the coils to bring the plate members into frictional contact to the rims of the driven gear 8. In this case, the above-explained advantages of the first example may also be achieved by the torque vectoring device 1 according to the second example.

Figure 3:
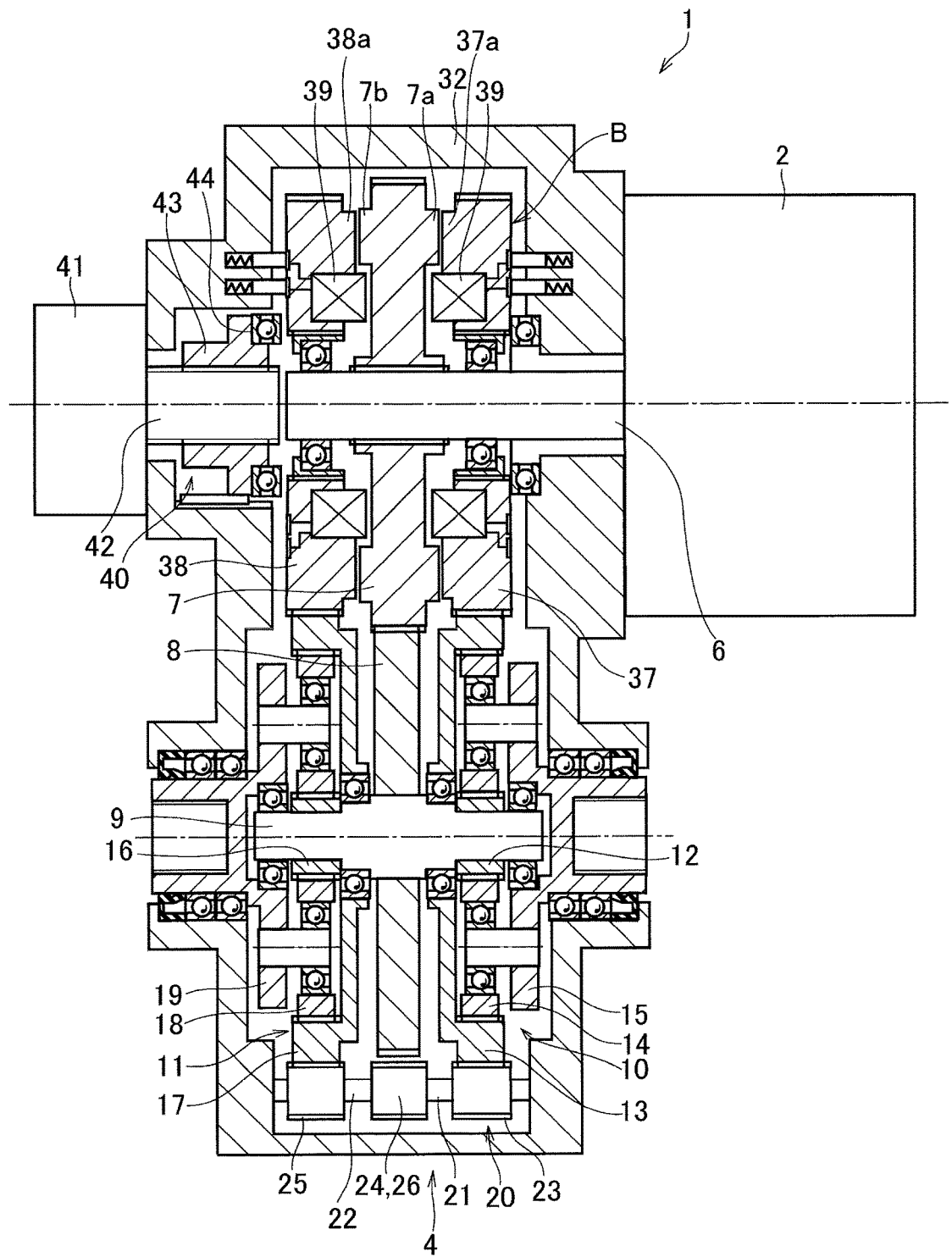
FIG. 3 is a schematic illustration showing a structure of the torque vectoring device according to a third example in which the output gear is used as a brake rotor.

Turning to FIG. 3, there is shown a third example of the torque vectoring device 1 in which the output gear 7 is used as the rotary member instead of the driven gear 8. According to the third example, a first brake gear 37 is fitted onto the output shaft 6 while being allowed to rotate relatively, and a second brake gear 38 is also fitted onto the output shaft 6 across the output gear 7 while being allowed to rotate relatively. The first brake gear 37 is meshed with the first ring gear 13, and the second brake gear 38 is meshed with the second ring gear 17. According to the third example, a pair of first rim 7a and second rim 7b is formed on each face of the output gear 7.

An annular first contact portion 37a is formed on one face of the first brake gear 37 opposed to the first rim 7a, and a friction member is attached to a contact face of the first contact portion 37a. Likewise, an annular second contact portion 38a is formed on one face of the second brake gear 38 opposed to the second rim 7b, and a friction member is attached to a contact face of the second contact portion 38a. A coil 39 is individually fitted into a depression formed on an inner circumference of the first contact portion 37a of the first brake gear 37, and a depression formed on an inner circumference of the second contact portion 38a of the second brake gear 38.

In order to bring the second brake gear 38 into contact to the output gear 7, a parking lock device 40 is attached to a side wall of the casing 32 in the opposite side of the drive motor 2. Specifically, an output shaft 42 of a parking lock motor 41 is inserted into the side wall of the casing 2 in such a manner as to extend coaxially with the output shaft 6. A male thread is formed on an outer circumferential surface of the output shaft 42 of the parking lock motor 41, and the output shaft 42 is screwed into a female thread hole formed on a center of an annular pushing member 43. That is, the pushing member 43 is reciprocated on the output shaft 42 of the parking lock motor 41 by rotating the output shaft 42. A bearing 44 is attached to a front face of the pushing member 43 to push the second brake gear 38 toward the output gear 7.

According to the third example, therefore, the output shaft 6 may be halted by rotating the output shaft 42 of the parking lock motor 41 to bring the second brake gear 38 into contact to the output gear 7, and the contact between the second brake gear 38 and the output gear 7 may be maintained even if a current supply to the parking lock motor 41 is stopped.

In the torque vectoring device 1 according to the third example, the above-explained advantages of the first example may also be achieved. In addition, since the output gear 7 fitted onto the output shaft 6 serves as a brake rotor, transfer of the heat of the output gear 7 resulting from frictional engagement to the differential unit 4 may be reduced. According to the third example, therefore, power loss of the differential unit 4 resulting from thermal expansion of the rotary element may be prevented. Further, since the driven gear 8 fitted onto the rotary shaft 9 is not used as a brake rotor, a clearance between the driveshafts may be shortened.

Figure 4:
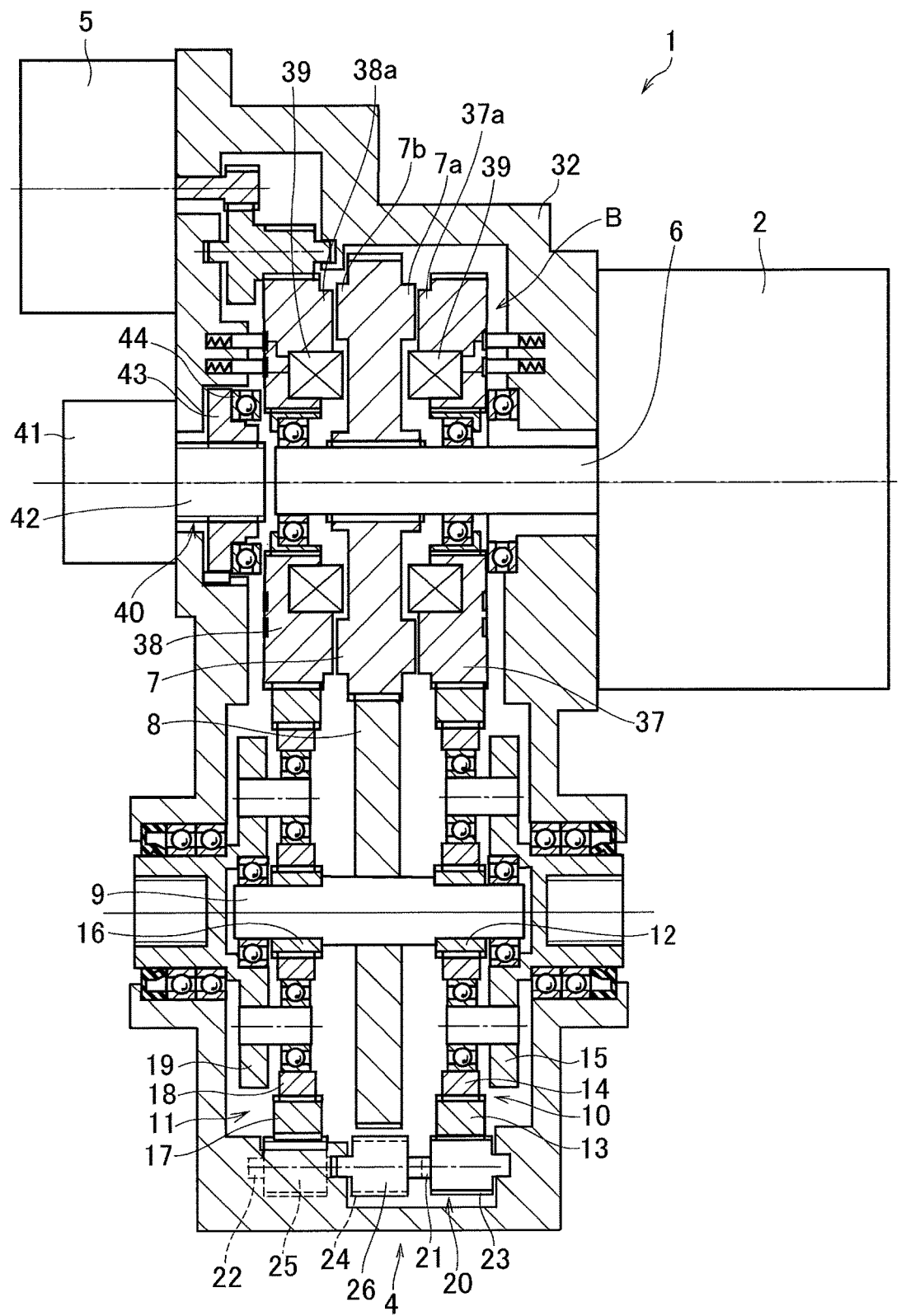
FIG. 4 is a schematic illustration showing a structure of the torque vectoring device according to a fourth example in which the output torque of the differential motor is applied to the ring gear.

In addition, according to the third example, a transmission device such as a gear is not interposed between the drive motor 2 and the brake device B. According to the third example, therefore, shares of brake torques of the drive motor 2 and the brake device B may be adjusted easily when applying the brake torque to the drive wheels 3a and 3b by the brake device B while operating the drive motor 2 as a generator. Optionally, as a fourth example of the torque vectoring device 1 shown in FIG. 4, the differential motor 5 may be connected to the second brake gear 38.

Figure 5:
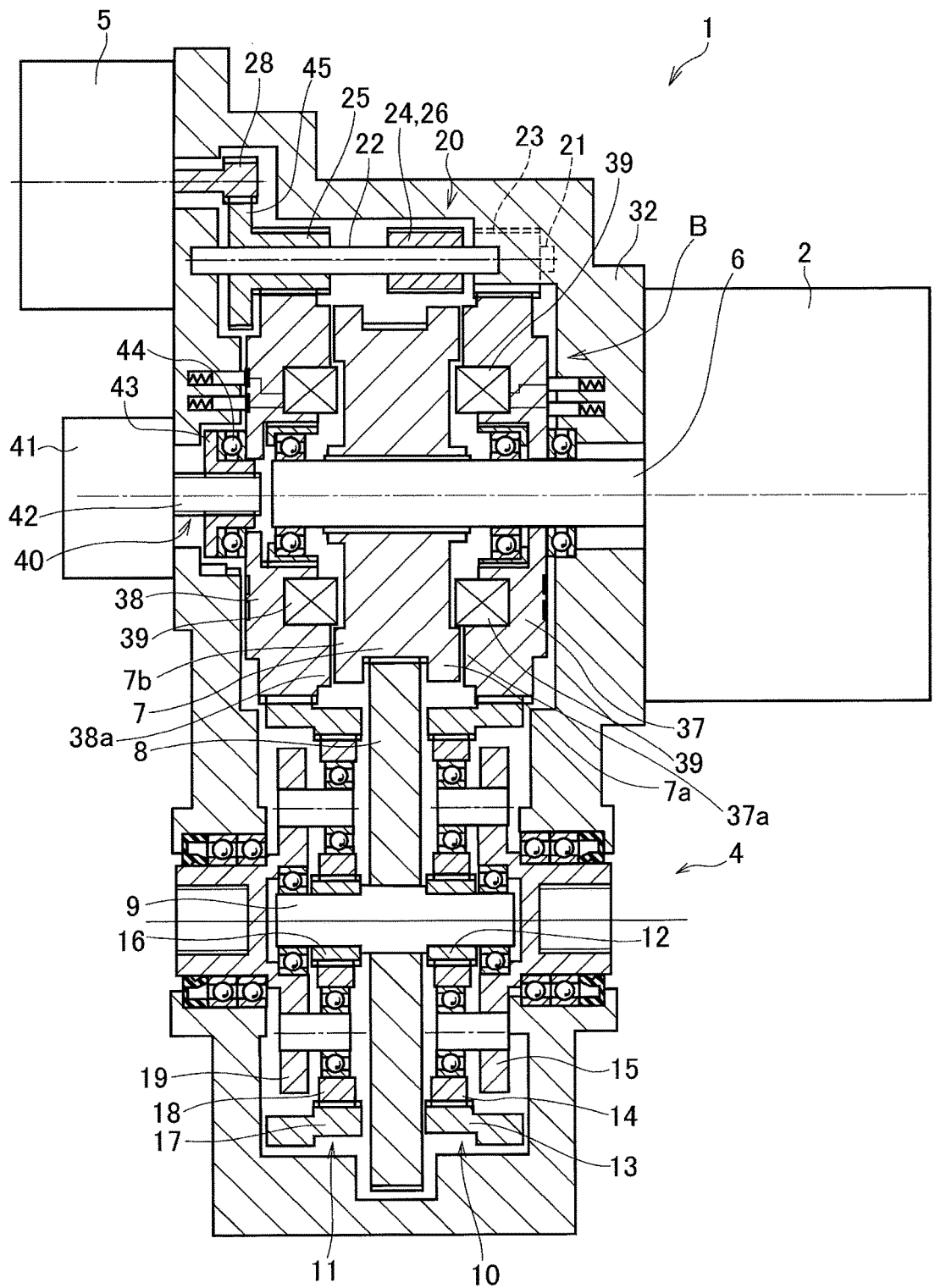
FIG. 5 is a schematic illustration showing a structure of the torque vectoring device according to a fifth example in which the brake gears are connected through the torque reversing mechanism.

Turning to FIG. 5, there is shown a fifth example of the torque vectoring device 1 in which the torque reversing mechanism 20 is engaged with the first brake gear 37 and the second brake gear 38. According to the fifth example, a driven gear 45 is formed integrally with the third pinion gear 25, and the driven gear 45 is meshed with the output gear 28 of the differential motor 5. In this case, an outer diameter of the driven gear 8 may be increased to be larger than those of the first ring gear 13 and the second ring gear 17. According to the fifth example, therefore, an output torque of the drive motor 2 may be delivered to the differential unit 4 while being amplified. In addition, since the torque reversing mechanism 20 is disposed above the differential unit 4, a vertical length of the torque vectoring device 1 below the differential unit 4 may be reduced. According to the fifth example, therefore, the driveshafts may be situated at a lower level. For this reason, an inclination of a not shown ball joint attached to a leading end of the driveshaft may be reduced to ensure preferable power transmitting efficiency to the drive wheel 3a (or 3b).

Although the above exemplary embodiment of the present application has been described, it will be understood by those skilled in the art that the torque vectoring device according to the present application should not be limited to the described exemplary embodiment, and various changes and modifications can be made within the spirit and scope of the present application.

What is claimed is:

1. A torque vectoring device, comprising:
    a drive motor;
    a differential unit including
    a first planetary gear unit having a first input element to which torque of the drive motor is applied, a first output element connected to a first one of a plurality of drive wheels of a vehicle on which the torque vectoring device is mounted, and a first reaction element which establishes reaction torque between the first input element and the first output element to output the torque applied to the first input element from the first output element, and
    a second planetary gear unit having a second input element to which the torque of the drive motor is applied, a second output element connected to a second one of the plurality of drive wheels, and a second reaction element which establishes reaction torque between the second input element and the second output element to output the torque applied to the second input element from the second output element;
    a differential motor that applies torque to one or both of the first reaction element and the second reaction element;
    a torque reversing mechanism that transmits the torque of the first reaction element to the second reaction element while reversing a rotation direction;
    a rotary shaft connecting the first input element and the second input element to each other;
    a rotary member that transmits the torque of an output shaft of the drive motor to the rotary shaft; and
    a brake that is configured to frictionally contact the rotary member to establish a braking force,
    wherein the brake is configured to apply the braking force to the rotary member by frictionally contacting either one of the first reaction element and the first output element to a first face of the rotary member, while frictionally contacting either one of the second reaction element and the second output element to a second face of the rotary member.

2. The torque vectoring device as claimed in claim 1, wherein
    the first planetary gear unit serves as a speed reducer when the first reaction element is rotated slower than the first input element, and
    the second planetary gear unit serves as a speed reducer when the second reaction element is rotated slower than the second input element.

3. The torque vectoring device as claimed in claim 1, wherein the brake is configured to electromagnetically control a friction force applied to the rotary member.

4. The torque vectoring device as claimed in claim 1, wherein the brake includes a wet-type brake in which oil is interposed between the one of the first reaction element and the first output element and the first face and the one of the second reaction element and the second output element and the second face.

* * * * *